March 1, 1927.
K. SCHERER
1,619,044
SPARE TIRE LOCK
Filed Nov. 23, 1923
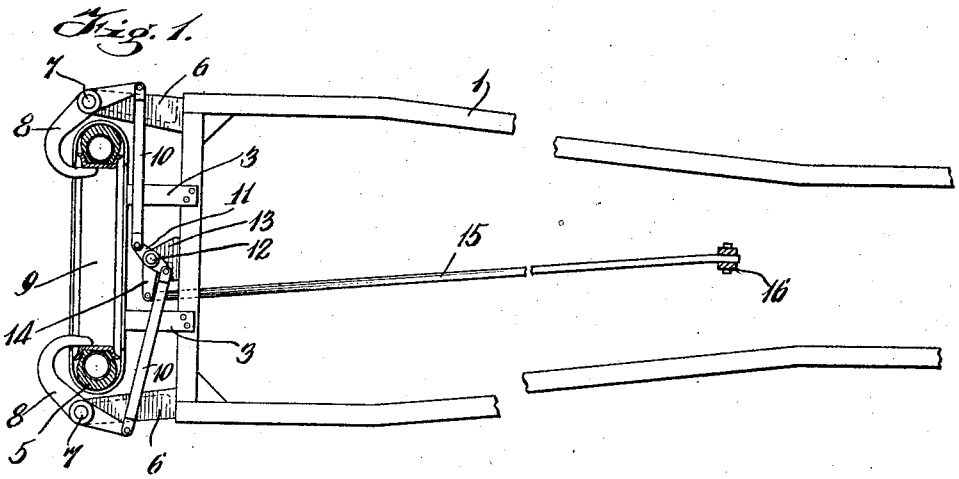
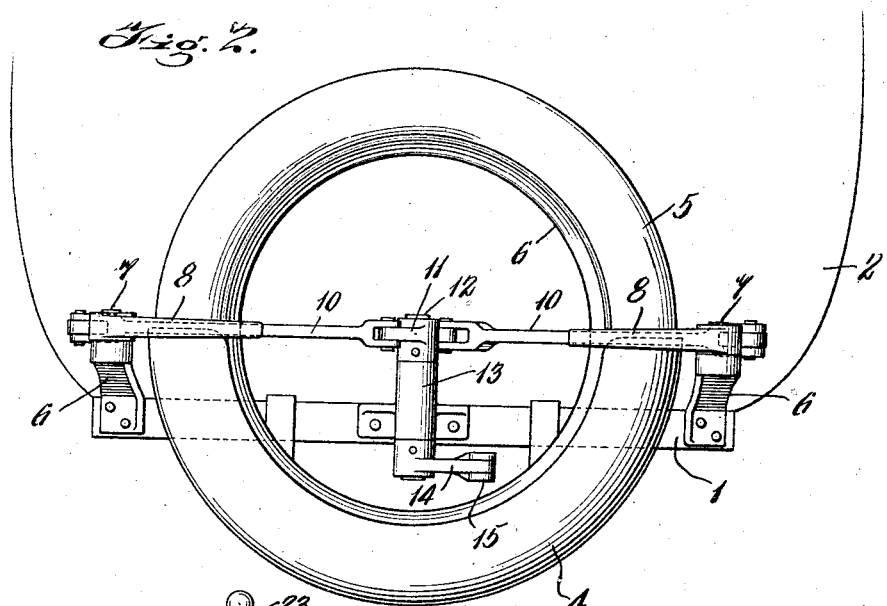
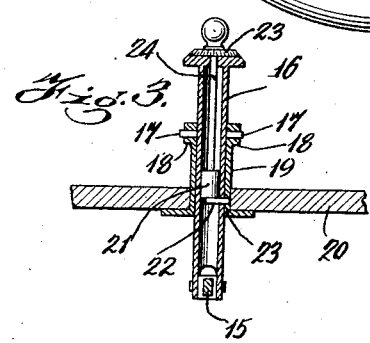
INVENTOR
*Karl Scherer*
BY
*Morris L. Fuchstein*
ATTORNEY Patented Mar. 1, 1927.

UNITED STATES PATENT OFFICE.

KARL SCHERER, OF NEW YORK, N. Y.

SPARE-TIRE LOCK.

Application filed November 23, 1923. Serial No. 676,492.

This invention relates to improvements in spare tire locks, and more particularly to an attachment for automobiles or other similar vehicles, which insures the proper holding and securing of the spare tire, through the medium of a device adjacent the driver's seat, so that the tire can only be released from within the car.

Heretofore tires have ordinarily been secured by chains and pad locks, so that a thief can remove the spare tire even though the car be occupied, and furthermore such devices rattle and become rusty so that they are difficult to remove in an emergency.

An object, therefore, of my invention is to provide locking means which constitutes to provide locking means which constitutes part of the car itself, and which can be securely locked against unauthorized removal.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown one of various possible illustrative embodiments of this invention, Fig. 1 is a sectional plan view showing my invention in position on an automobile chassis illustrated partially.

Fig. 2 is a view in rear elevation.

Fig. 3 is a view in longitudinal section through the controlling lever.

1 represents the chassis of an automobile or other vehicle, supporting a body 2, and provided at its rear end with a pair of rearwardly projecting arms 3, to which a tire cradle or other similar support 4 is fixed. This cradle 4 is semi-circular in elevation and also in cross section and is adapted to receive the lower portion of a spare tire 5 and support the same at the rear of the car.

Brackets 6 project rearwardly from the end of the chassis adjacent the sides thereof, and provide pivotal mounting, as shown at 7, for a pair of hook shaped levers 8. These levers 8 are fulcrumed between their ends, the longer rear ends of the levers constituting hooks to engage the rim 9 of spare tire 5 and securely clamp and hold the spare tire in the cradle 4. The forward shorter ends of the levers 8 are connected by links 10 with a cross head 11. This cross head 11 and links 10 constitute a toggle lever for causing the pivotal movement of the hook-shaped levers 8, as will more fully hereinafter appear. The cross head 11 is fixed at its center to a short vertical shaft 12, mounted in a fixed bracket 13 on the chassis and a crank arm 14 is fixed to the lower end of the shaft 12 and is connected by a forwardly projecting rod 15 to an operating lever 16 at the forward portion of the car and in convenient reach of the operator.

This lever 16 is shown in longitudinal section in Figure 3 and it will be noted that the said lever 16, is of tubular form and is provided between its ends with a pair of trunnions 17 mounted in suitable bearings 18, in a support 19, the latter being fixed to the foot-board or platform 20, of the car.

It is of course to be understood that the lever 16 has a pivotal movement to cause the locking or releasing of the spare tire. To provide positive locking means for the lever 16, I illustrate a form of lock 21, within the lever, having a bolt 22, which projects through the lever into a recess 23 in the support 19. This lock 21 is controlled by a rotary disk 23 connected by a shaft 24 with the mechanism of the lock, so that by turning the disk to the proper combination, the lock can be released whenever it is desired to remove, the spare tire.

The operation of the device will now be clear:

The lock 21 is first operated to release the bolt 22 from locking position and then the upper end of the lever 16 is moved rearwardly causing its lower end to move forwardly, and through the medium of the crank arm 14, shaft 12, cross head 11, and links 10, cause the hook shaped levers 18 to rotate so as to move their hook shape ends rearwardly and outwardly. This movement of the levers 8 will so position them as to permit the spare tire 5 to be elevated from the cradle 4. When another tire is placed in position in the cradle the movement of the parts is reversed to bring the hook-shaped levers 8 into locking position. The lever 16 is then locked, and the spare is effectually secured.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, what I claim as new and desire to secure by Letters Patent:—

1. An automobile accessory comprising a cradle adapted to support a demountable spare tire, means for securing said cradle to an automobile, a hook-shaped lever swingably mounted in spaced relation to said means, said lever having its free end abut the demountable rim of said tire for securing the tire in the cradle, a hand lever adapted to be mounted adjacent the driver's seat, and means operatively interconnecting said levers.

2. In combination, a vehicle, an arcuately shaped spare tire supporting cradle adapted to be carried at the rear of the vehicle, a pair of hook-shaped levers disposed adjacent the ends of said cradle adapted to engage the demountable rim of a tire carried in said cradle, a hand lever within the vehicle, means operatively connecting said levers, and a locking means for said hand lever effective to releasably lock the tire in the cradle.

3. The combination with a vehicle, a tire cradle secured thereto, and brackets fixed to the vehicle, of a cross head pivotally mounted on one of the brackets, a pair of tire engaging levers pivotally supported on other of said brackets, links connecting the levers and cross head, and means for moving said cross head.

In testimony whereof I affix my signature.

KARL SCHERER.